United States Patent
Jeong et al.

(10) Patent No.: US 9,930,724 B2
(45) Date of Patent: *Mar. 27, 2018

(54) PAGING METHOD AND APPARATUS FOR COMMUNICATION OF M2M/MTC DEVICE OPERATING IN HIGH POWER SAVING RECEPTION MODE IN A MOBILE COMMUNICATION SYSTEM, AND SYSTEM THEREOF

(71) Applicant: Samsung Electronics Co., Ltd, Gyeonggi-do (KR)

(72) Inventors: Kyeong-In Jeong, Gyeonggi-do (KR); Soeng-Hun Kim, Gyeonggi-do (KR); Jung-Soo Jung, Gyeonggi-do (KR); Sang-Bum Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,430

(22) Filed: Jul. 30, 2015

(65) Prior Publication Data

US 2016/0029433 A1    Jan. 28, 2016

Related U.S. Application Data

(63) Continuation of application No. 13/521,209, filed as application No. PCT/KR2011/000147 on Jan. 10, 2011, now Pat. No. 9,125,157.

(30) Foreign Application Priority Data

Jan. 8, 2010    (KR) ........................ 10-2010-0002028

(51) Int. Cl.
    *H04W 76/04*    (2009.01)
    *H04W 52/02*    (2009.01)
    (Continued)

(52) U.S. Cl.
    CPC ......... *H04W 76/048* (2013.01); *H04W 4/005* (2013.01); *H04W 52/0216* (2013.01);
    (Continued)

(58) Field of Classification Search
    None
    See application file for complete search history.

(56) References Cited

U.S. PATENT DOCUMENTS

2007/0286080 A1* 12/2007 Kim ................. H04W 52/0235
                                                    370/236
2008/0182596 A1*  7/2008 Wang ................. H04W 68/025
                                                    455/458

(Continued)

FOREIGN PATENT DOCUMENTS

EP    1944985 A1    7/2008
EP    2015478 A2    1/2009
(Continued)

OTHER PUBLICATIONS

Extended European Search Report dated Nov. 25, 2013 in connection with European Patent Application No. 11731962.4; 6 pages.
(Continued)

*Primary Examiner* — Bunjob Jaroenchonwanit (57) ABSTRACT method is provided for communicating with a User Equipment (UE) supporting a High Power Saving Reception Mode (HPSRM) mode by an evolved Node B (eNB) in a wireless communication system. The method includes receiving Discontinuous Reception (DRX) cycle information from a network entity performing mobility management for the UE by the eNB communicating with the UE over a wireless link; and broadcasting system information including the DRX cycle information. The DRX cycle information is set longer than DRX cycle information of a UE non-supporting the HPSRM mode. By doing so, an efficient
(Continued)

paging method for an UE operating in the HPSRM mode may be provided.

20 Claims, 7 Drawing Sheets (51) Int. Cl.
    *H04W 4/00*     (2018.01)
    *H04W 68/00*     (2009.01)
    *H04W 88/08*     (2009.01)

(52) U.S. Cl.
    CPC ...... *H04W 68/005* (2013.01); *H04W 52/0287* (2013.01); *H04W 88/08* (2013.01); *Y02B 60/50* (2013.01)

(56) References Cited

U.S. PATENT DOCUMENTS

| | | | |
|---|---|---|---|
| 2008/0214249 A1 | 9/2008 | Kim et al. | |
| 2009/0175186 A1* | 7/2009 | Du | H04W 76/048 370/252 |
| 2010/0208660 A1* | 8/2010 | Ji | H04W 52/0225 370/328 |
| 2010/0309798 A1* | 12/2010 | Fodor | H04W 52/06 370/252 |
| 2011/0002281 A1* | 1/2011 | Terry | H04W 52/0216 370/329 |
| 2011/0039536 A1* | 2/2011 | Lee | H04W 76/048 455/422.1 |
| 2014/0016492 A1* | 1/2014 | Jung | H04W 24/10 370/252 |
| 2014/0016580 A1 | 1/2014 | Kim et al. | |

FOREIGN PATENT DOCUMENTS

| | | |
|---|---|---|
| GB | 2402301 | 12/2004 |
| KR | 1020040036966 A | 5/2004 |
| KR | 1020070024302 A | 3/2007 |
| KR | 1020080065886 A | 7/2008 |
| WO | WO 2008/114130 A2 | 9/2008 |
| WO | 2008133469 A1 | 11/2008 |
| WO | 2008143563 A1 | 11/2008 |
| WO | WO 2011084024 A2 | 7/2011 |

OTHER PUBLICATIONS

Foreign Communication from Related Counterpart Application; European Patent Application No. 17179195.7; Extended European Search Report dated Aug. 3, 2017; 9 pages.

* cited by examiner

PAGING METHOD AND APPARATUS FOR COMMUNICATION OF M2M/MTC DEVICE OPERATING IN HIGH POWER SAVING RECEPTION MODE IN A MOBILE COMMUNICATION SYSTEM, AND SYSTEM THEREOF

CROSS-REFERENCE TO RELATED APPLICATIONS

The present application is a continuation of U.S. patent application Ser. No. 13/521,209 filed Jul. 9, 2012, which is related to and claims priority under 35 U.S.C. §365 to International Patent Application No. PCT/KR2011/000147 filed Jan. 10, 2011, entitled "PAGING METHOD AND APPARATUS FOR COMMUNICATION OF M2M /MTC DEVICE OPERATING IN HIGH POWER SAVING RECEPTION MODE IN A MOBILE COMMUNICATION SYSTEM, AND SYSTEM THEREOF". International Patent Application No. PCT/KR2011/000147 claims priority under 35 U.S.C. §365 and/or 35 U.S.C. §119(a) to Korean Patent Application No. 10-2010-0002028 filed Jan. 8, 2010 and which are incorporated herein by reference into the present disclosure as if fully set forth herein.

TECHNICAL FIELD

The present invention relates generally to a paging method and apparatus in a mobile communication system, and more particularly, to a paging method and apparatus for various devices operating in a High Power Saving Reception Mode (hereinafter referred to as an 'HPSRM' mode).

BACKGROUND ART

Generally, mobile communication systems have been developed, aiming to provide communication while securing mobility of users. Due to the rapid development of technologies, the mobile communication systems now can provide not only voice communication services but also high-speed data communication services. Recently, standardization for Long Term Evolution (LTE), one of the next-generation mobile communication systems, is in progress in 3$^{rd}$ $^{Generation\ Partnership\ Project\ (3GPP)}$. LTE is a technology aimed to be commercialized in around 2010 and implementing high-speed packet-based communications at a data rate as high as 100 Mbps, which is higher than that currently available. Recently, many discussions have been made to provide various new services to LTE communication systems. A typical one of the technologies to be newly introduced may include Machine To Machine, Machine Type Communication (hereinafter referred to as 'M2M/MTC') communication.

M2M/MTC communication, also known as inter-device communication, refers to communication between an electronic device and an electronic device, or between an electronic device and a data server over a mobile communication network. In early 1990s when the concept of the M2M/MTC communication was first introduced, the M2M/MTC communication was considered the concept of remote control, telematics, or the like and its derivatives market was very limited, but the M2M/MTC communication has grown into a big worldwide market for the last few years with the fast growth. The M2M/MTC technology may be used in the field of automotive telematics, logistic management, intelligent metering system, remote asset management system, Point-Of-Sale (POS) system, and security-related industry.

Compared with the existing mobile phones used in the mobile communication system, M2M/MTC devices are recommended to operate in an HPSRM mode with a low-power transmission power unit in order to reduce the price of M2M/MTC communication modules. Otherwise, the price of the M2M/MTC devices may increase, hindering the widespread use of the M2M/MTC devices.

Figure 1:
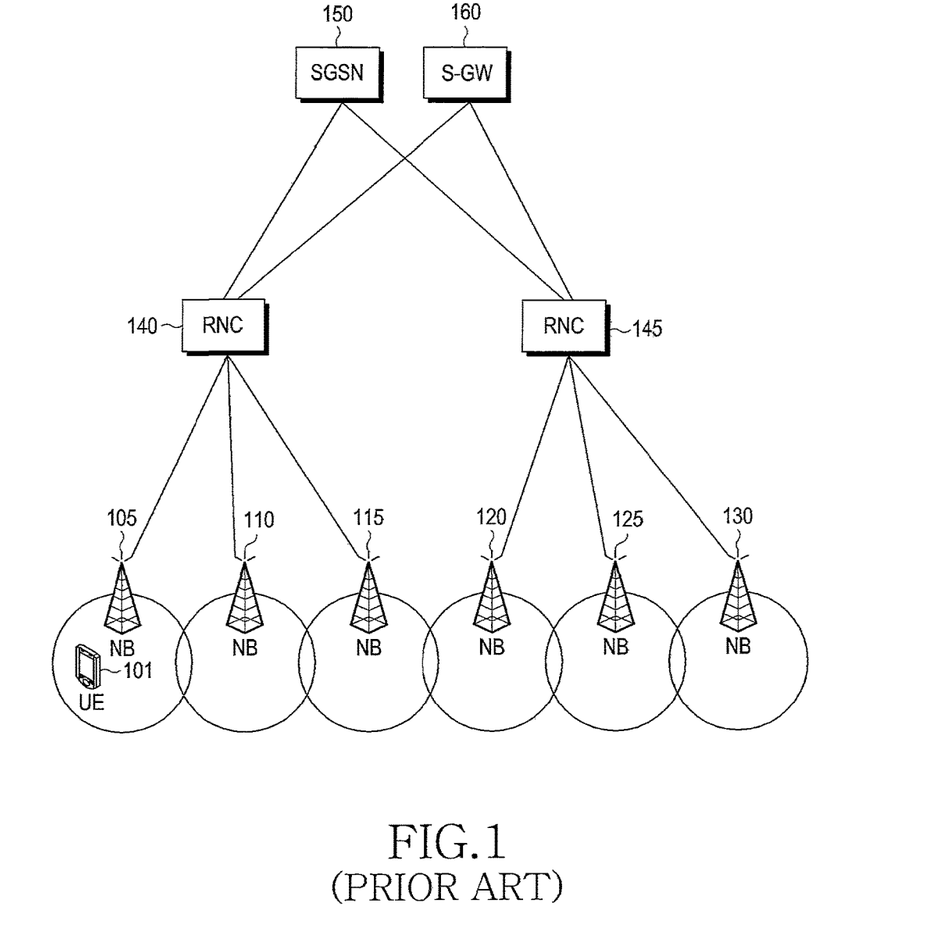
FIG. 1 is a diagram illustrating a configuration example of a 3GPP UMTS/GPRS mobile communication system.

FIG. 1 illustrates a configuration example of a 3GPP UMTS/GPRS mobile communication system.

Referring to FIG. 1, a User Equipment (UE) 101 means a terminal device or a subscriber participating in the wireless communication, and the UE 101 is wirelessly connected to a Node B (NB) 105. Node Bs 105, 110, 115, 120, 125, and 130, wireless base station devices directly participating in communication with UEs, manage their own cells. Radio Network Controllers (RNCs) 140 and 145 control a plurality of Node Bs, and control radio resources. The RNCs 140 and 145 are connected to a Packet Switched or Packet Service (PS) network by a Serving GPRS Support Node (SGSN) 150. Connections between the RNCs 140 and 145 and the SGSN 150 are called an IuPS interface, and transmit/receive PS control signaling. The SGSN 150 takes charge of various control functions, and manages mobility of idle mode UEs. The SGSN 150 manages service billing-related data of each subscriber, and controls a function of selectively transmitting and receiving the data it should exchange with the UE 101, by means of the Serving RNC (SRNC) 140 managing the UE 101. A Serving Gateway (S-GW) 160, a device providing data bearers, generates/removes data bearers under control of the SGSN 150.

Figure 2:
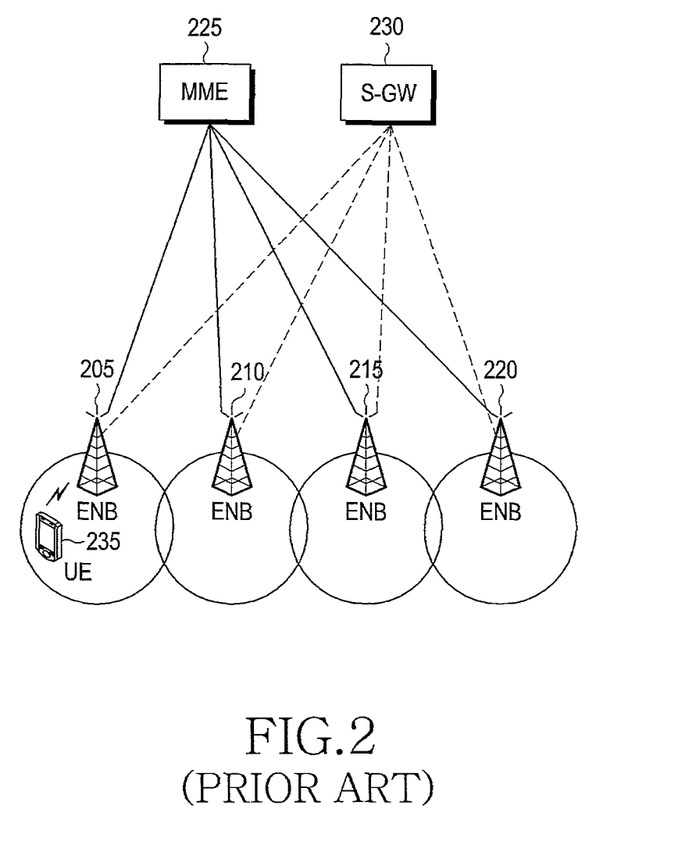
FIG. 2 is a diagram illustrating a configuration example of a 3GPP LTE mobile communication system.

FIG. 2 illustrates a configuration example of a 3GPP LTE mobile communication system.

Referring to FIG. 2, a Radio Access Network (RAN) of the LTE mobile communication system includes evolved Node Bs (eNBs) 205, 210, 215, and 220, a Mobility Management Entity (MME) 225, and a Serving Gateway (S-GW) 230. A UE 235 accesses an external network via the ENB 205 and the S-GW 230. Each of the ENBs 205 to 220 corresponds to a combined entity of the legacy NB and its RNC in the UMTS system described with reference to FIG. 1.

The ENB 205 is connected to the UE 235 through a wireless channel, and performs a more complex function than the legacy NB. In LTE, since all user traffics including real-time services based on the Internet Protocol (IP), such as Voice over IP (VoIP), are serviced through a shared channel, devices for performing scheduling by collecting status information of UEs are required, and this operation is controlled by the ENBs 205 to 220. The ENBs 205 to 220 take charge of controlling radio resources of their cells. One ENB generally controls a plurality of cells.

To achieve the data rate as high as 100 Mbps, LTE uses Orthogonal Frequency Division Multiplexing (OFDM) as a wireless access technology in a bandwidth of a maximum of 20 MHz. In addition, LTE employs Adaptive Modulation & Coding (AMC) that adaptively determines a modulation scheme and a channel coding rate depending on the channel status of UEs. The S-GW 230, a device providing data bearers, generates/removes data bearers under control of the MME 225. The MME 225, a device for taking charge of various control functions and performing mobility management for idle mode UEs, is connected to a plurality of ENBs.

Figure 3:
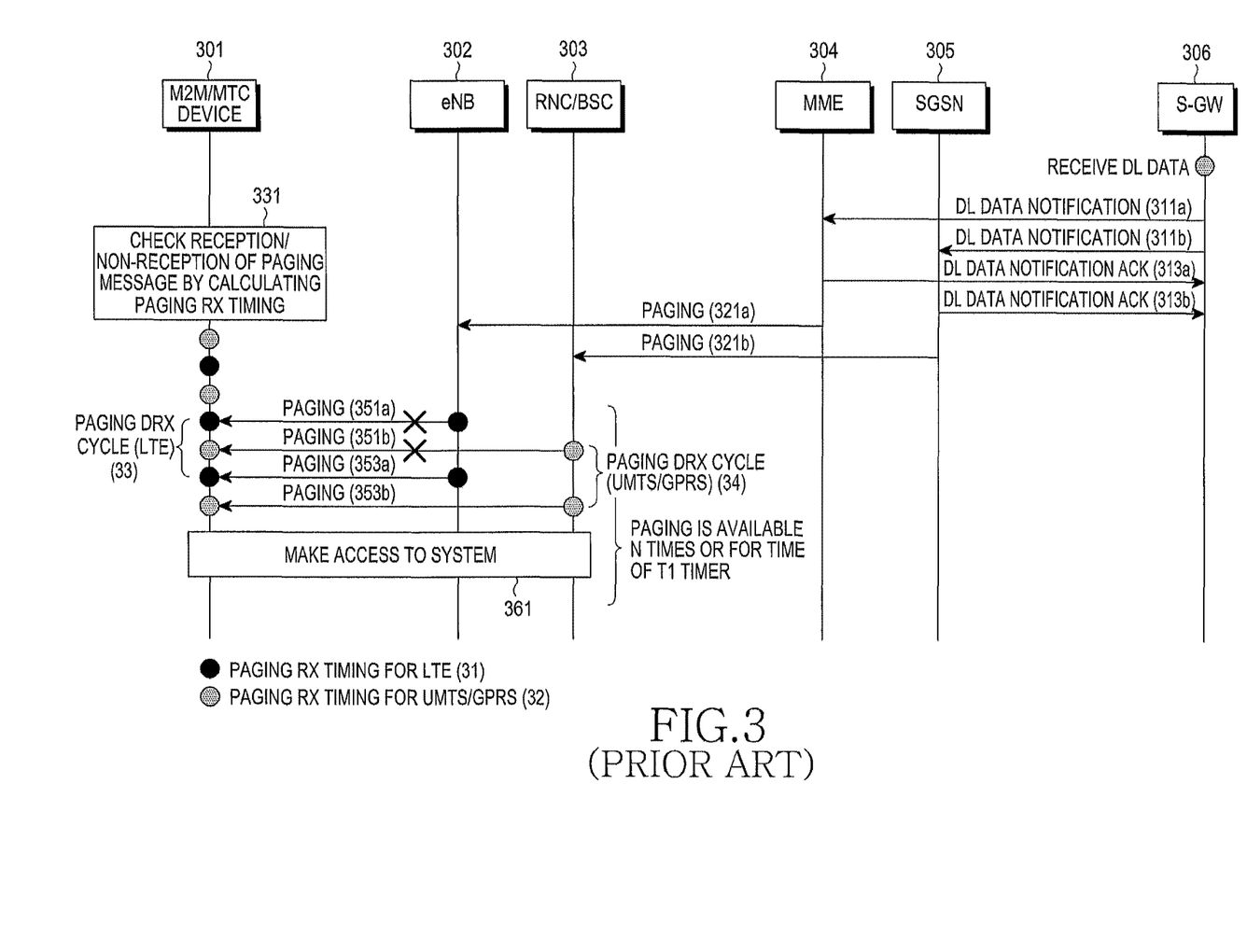
FIG. 3 is a signal flow diagram illustrating an example of an existing paging method in a 3GPP LTE/UMTS/GPRS system.

FIG. 3 illustrates an example of an existing paging procedure in a 3GPP LTE/UMTS/GPRS system, in which for convenience of description, the conventional paging procedures both in the LTE system and the UMTS/GPRS system are illustrated together.

In FIG. 3, reference numeral 301 represents a UE (or M2M/MTC device), reference numerals 302 and 304 represent an eNB and an MME, respectively, and reference numerals 303 and 305 represent an RNC/BSC and an SGSN, respectively, constituting the UMTS/GPRS system. The Base Station Controller (BSC), an entity for controlling radio resources in the GPRS system, performs a similar function to that of the RNC in the UMTS system. Reference numeral 306 represents an S-GW in the LTE/UMTS/GPRS system. Reference numeral 31 represents a paging reception time applied to the existing UE in the LTE system, and the paging reception time refers to a specific radio frame, or a subframe in the radio frame. Reference numeral 32 represents a paging reception time applied to the existing UE in the UMTS/GPRS system, reference numeral 33 represents a paging Discontinuous Reception (DRX) cycle in the LTE system, and reference numeral 34 represents a paging DRX cycle in the UMTS/GPRS system.

Referring to FIG. 3, upon receiving DownLink (DL) data for a specific UE, the S-GW 306 transmits a DL Data Notification message indicating the reception of the DL data for a UE, to the MME 304 and the SGSN 305, which are controlling the UE 301, in steps 331a and 331b. Upon successfully receiving the DL Data Notification message, the MME 304 and the SGSN 305 transmit to the S-GW 306 a DL Data Notification ACK message indicating their successful reception of the DL Data Notification message in steps 313a and 313b.

The MME 304 and the SGSN 305 transmit a Paging message to the eNBs 302 and the RNCs/BSCs 303 existing in a paging area (e.g., Routing Area (RA) of the UMTS system and Tracking Area (TA) of the LTE system) where the UE 301 is located, in steps 321a and 321b, respectively. The Paging message includes Identification (ID) information of the UE 301 subjected to paging, and information based on which the eNB 302 and the RNC/BSC 303 can calculate when they should transmit the Paging message on a wireless/radio basis. For example, the latter information includes a UE paging DRX cycle and a UE identity index value or UE id, which are used as input values for calculating a radio frame and a subframe carrying the Paging message. For more details, reference can be made to 3GPP standard TS36.413.

Upon receiving the Paging messages in step 321a and 321b, the eNB 302 and the RNC/BSC 303 calculate a time/timing for which they will wirelessly transmit a Paging message for a target UE, based on information included in the received Paging messages. This is because an idle mode UE, performing a power saving operation, generally wakes up at intervals of a paging DRX cycle and checks whether a Paging message is received at the wake-up timing, in step 331.

That is, the eNB 302 and the RNC/BSC 303 should transmit a Paging message for the UE 301 in sync with the timing (e.g., a specific subframe in a specific radio frame in the LTE system) for which the UE 301 wakes up to receive a Paging message at intervals of the paging DRX cycle. Otherwise, the UE 301 may fail to receive the Paging message. Therefore, in terms of the input values, the method in which the UE 301 calculates in step 331 a timing for which it wakes up to receive its Paging message, should be the same as the method in which having received the Paging message in steps 321a and 321b, the eNB 302 and the RNC/BSC 303 calculate a timing for which they will transmit Paging messages for the UE 301. The UE 301 uses its UE id and a paging DRX cycle to calculate a timing for which it will receive a Paging message, while the eNB 302 and the RNC/BSC 303 use the UE id or UE id index, and the paging DRX cycle to calculate a timing for which they will transmit their Paging messages to the UE 301. For more details, reference can be made to the 3GPP UMTS standards TS25.304 and TS25.413, and the 3GPP LTE standards TS36.304 and TS36.413.

Referring to FIG. 3, the eNB 301 and the RNC/BSC 302 transmit Paging messages at intervals of the paging DRX cycle in sync with the paging reception timing of the UE 301 (in steps 351a & 353a in the LTE system, or in steps 351b & 353b in the UMTS/GPRS system). If the UE 301 has failed to receive the transmitted Paging message due to a wireless error in steps 351a and 351b, the UE 301 does not access the system since it has no knowledge of the transmission of the Paging message. In this case, since there is reply to the Paging message, the eNB 302 and the RNC/BSC 303 retransmit the Paging message in steps 353a and 353b, considering that the UE 301 has failed to receive the Paging message. Upon successfully receiving the Paging message retransmitted in steps 353a and 353b, the UE 301 will make access to the system in step 361, and upon detecting the access, the eNB 302 and the RNC/BSC 303 stop the transmission of the Paging message, determining that the UE 301 has successfully received the Paging message. In the absence of the access by the UE 301, the eNB 301 and the RNC/BSC 303 may retransmit the Paging message N1 times (the predetermined number of retransmissions) or for a time of a T1 timer.

However, the above-described procedure of FIG. 3 merely shows an operation of receiving a Paging message by a UE such as the existing mobile phone in an idle mode. If an M2M/MTC device (or UE) supporting the HPSRM mode (hereinafter referred to as an 'HPSRM M2M/MTC device') performs the procedure of FIG. 3 in an idle mode, the effects of the HPSRM mode may not be expected. Therefore, there is a need to newly define a paging procedure for M2M/MTC devices operating in the HPSRM mode using a low-power transmission power unit in the mobile communication network.

DISCLOSURE OF INVENTION

Technical Problem

Exemplary embodiments of the present invention provide an efficient communication method and apparatus for User Equipments (UEs) operating in a High Power Saving Reception Mode (HPSRM) mode in a mobile communication system.

Exemplary embodiments of the present invention provide an efficient paging method and apparatus for communication of devices operating in an HPSRM mode in a mobile communication system, and a system thereof.

Exemplary embodiments of the present invention provide an efficient paging method and apparatus for HPSRM M2M/MTC communication in a mobile communication system, and a system thereof.

Solution to Problem

In accordance with one aspect of the present invention, there is provided a method for communicating with a User Equipment (UE) supporting a High Power Saving Reception Mode (HPSRM) mode by an evolved Node B (eNB) in a wireless communication system. The method includes receiving Discontinuous Reception (DRX) cycle information from a network entity performing mobility management for the UE by the eNB communicating with the UE over a wireless link; and broadcasting system information including the DRX cycle information. The DRX cycle information is set longer than DRX cycle information of a UE non-supporting the HPSRM mode.

In accordance with another aspect of the present invention, there is provided an evolved Node B (eNB) for communicating with a User Equipment (UE) supporting a High Power Saving Reception Mode (HPSRM) mode in a wireless communication system. The eNB includes a receiver for receiving information from a network entity performing mobility management for the UE; a transmitter for transmitting information to the UE; and a controller for generating system information including Discontinuous Reception (DRX) cycle information of the UE, received from the network entity, and broadcasting the system information to the UE. The DRX cycle information is set longer than DRX cycle information of a UE non-supporting the HPSRM mode.

In accordance with further another aspect of the present invention, there is provided a method for communicating with an evolved Node B (eNB) by a User Equipment (UE) supporting a High Power Saving Reception Mode (HPSRM) mode in a wireless communication system. The method includes receiving system information including Discontinuous Reception (DRX) cycle information from the eNB; and calculating a DRX cycle for communication with the eNB based on the DRX cycle information. The DRX cycle information is set longer than DRX cycle information of a UE non-supporting the HPSRM mode.

In accordance with yet another aspect of the present invention, there is provided a User Equipment (UE) supporting a High Power Saving Reception Mode (HPSRM) mode, and communicating with an evolved Node B (eNB) in a wireless communication system. The UE includes a receiver for receiving information from the eNB; and a controller for calculating a Discontinuous Reception (DRX) cycle for communication with the eNB based on system information including DRX cycle information received from the eNB. The DRX cycle information is set longer than DRX cycle information of a UE non-supporting the HPSRM mode.

BRIEF DESCRIPTION OF DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

MODE FOR THE INVENTION

Exemplary embodiments of the present invention will now be described in detail with reference to the accompanying drawings. The present invention may, however, be embodied in many different forms and should not be construed as being limited to the embodiments set forth herein.

The present invention provides an efficient method and apparatus for transmitting a paging message to an HPSRM M2M/MTC device and allowing the HPSRM M2M/MTC device to receive the Paging message.

While an HPSRM M2M/MTC device will be used as a device receiving a paging message in an exemplary embodiment of the present invention for convenience of description, it should be noted that the present invention is not limited to the M2M/MTC device. In other words, the present invention may be applied not only to the HPSRM M2M/MTC device such as various gauges, but also to various communication terminals operating in the HPSRM mode. Herein, the term 'HPSRM' refers to an operation mode of minimizing the receive power consumed by a pertinent device during wireless/radio reception.

Although an MME and an eNB of the LTE system and an SGSN and an RNC/BSC of the UMTS/GPRS system will be used as network entities participating in transmitting a paging message to an HPSRM M2M/MTC device in an embodiment of the present invention, the present invention may be applied to other systems including network nodes having the same or similar functions. While exemplary embodiments of the present invention will be described with reference to the LTE system and the UMTS/GPRS system by way of example, the present invention is not limited thereto and may be applied in the same way to any cases in which a wireless terminal operates in the HPSRM mode in various wireless communication systems transmitting/receiving paging messages. Herein, the eNB/RNC/BSC may be referred to as, for example, an eNB or a base station, and the MME and the SGSN may be referred to as a network entity or a server managing mobility of UEs.

In an embodiment of the present invention, an MME/SGSN sets separate paging DRX cycle information for reception of paging messages for HPSRM M2M/MTC devices, and transmits the set information to an eNB/RNC/BSC. The separate paging DRX cycle information may include, for example, an N2 value. The N2 value may include a multiple value of a paging DRX cycle allocated for the existing UE such as a mobile phone, or a multiple value of a modification cycle (e.g., modification cycle of the LTE system, for which reference can be made to 3GPP standard TS36.331) of intra-cell system information in a mobile communication system. The modification cycle of system information may generally include a multiple value of a public paging DRX cycle. Also, the modification cycle may include a modification of each of the above multiple values (for example, N2*10 ms). In an embodiment of the present invention, the paging DRX cycle information is defined as an N2 value in the accompanying drawings and the following description, for convenience of description. Although the multiple value will be defined as a multiple value of the existing paging DRX cycle for a UE such as a mobile phone, it should be noted that the present invention is not limited thereto, and is subject to various modifications.

Upon receiving the paging DRX cycle information from the MME/SGSN, the eNB/RNC/BSC sets the received paging DRX cycle information as system information, and broadcasts the set information to an M2M/MTC device(s) in its cell. Upon receiving the paging DRX cycle information as system information, an HPSRM M2M/MTC device calculates a timing for which it will receive a paging message from the system, using the existing paging DRX cycle information for a UE such as a mobile phone, and id information of the M2M/MTC device.

For example, in the LTE system, an HPSRM M2M/MTC device checks reception/non-reception of a paging message for the M2M/MTC device at a first paging message reception timing (e.g., a specific radio frame or a specific subframe in the radio frame) calculated using the device id and the existing paging DRX cycle for a UE such as a mobile phone. After the first paging message reception timing, the M2M/MTC device re-checks the reception/non-reception of a paging message after a lapse of (i) N2 *'existing paging DRX cycle for a UE such as a mobile phone', (ii) N2 *'modification cycle of system information', or (iii) N2 ms/s or N2*10 ms. After the calculated first paging message reception timing, the M2M/MTC device checks the reception/non-reception of a paging message at intervals of the above extended paging DRX cycle rather than the existing paging DRX cycle for a UE such as a mobile phone.

If DL data to be transmitted to a relevant M2M/MTC device(s) is received at an S-GW, an MME/SGSN transmits a paging message to its associated eNB/RNC/BSC, and if a target device to receive the paging message is an HPSRM M2M/MTC device(s), the transmitted paging message includes information indicating that the target device to receive the paging message is an HPSRM M2M/MTC device(s).

On the other hand, if the target device to receive the paging message is not an HPSRM M2M/MTC device(s), the transmitted paging message includes information indicating that the target device to receive the paging message is not an HPSRM M2M/MTC device(s). In the case where the target device to receive the paging message is an HPSRM M2M/MTC device(s), if there is no response message/access for paging from the target M2M/MTC device described in FIG. 3 (in step 361 of FIG. 3), the eNB/RNC/BSC, having received the paging message, may retransmit the paging message N3 times (where N3 represents the number of retransmissions and is different from the number N1 of retransmissions) or for a time of a T3 timer (which is different from a T1 timer) considering, for example, the N2 value as the proposed paging DRX cycle information broadcasted as intra-cell system information, instead of retransmitting the paging message N1 times (where N1 represents a predetermined number of retransmissions) or for a time of a T1 timer. This is because that since a paging DRX cycle in which the HPSRM M2M/MTC device(s) checks the reception/non-reception of a paging message is longer by, for example, a multiple of N2 than the existing paging DRX cycle for a UE such as a mobile phone, the number N1 of retransmissions or the time of a T1 timer based on the existing paging DRX cycle may not reliably guarantee the reception of a paging message by the M2M/MTC device(s).

Therefore, if a target device to receive a paging message is an HPSRM M2M/MTC device(s), the number N1 of transmissions or the T1 timer value determining the existing number of retransmissions for a paging message should be appropriately re-set as the number N3 of retransmissions or a T3 timer value, which is greater than the number N1 of retransmissions or the T1 timer value, considering the N2 value which is paging DRX cycle information proposed by the present invention.

An embodiment of the present invention provides a method for setting an N2 value as paging DRX cycle information as described above, and allowing an MME/SGSN to transmit the N2 value to an eNB/RNC/BSC, and the eNB/RNC/BSC to broadcast the received N2 value as system information in the cell. In the alternative, an operating method of determining the N2 value as a prefixed value by the 3GPP standard, and an operating method of notifying an upper layer of, as the N2 value, a value determined in the upper layer of each of the M2M/MTC devices may also be available.

Figure 4A:
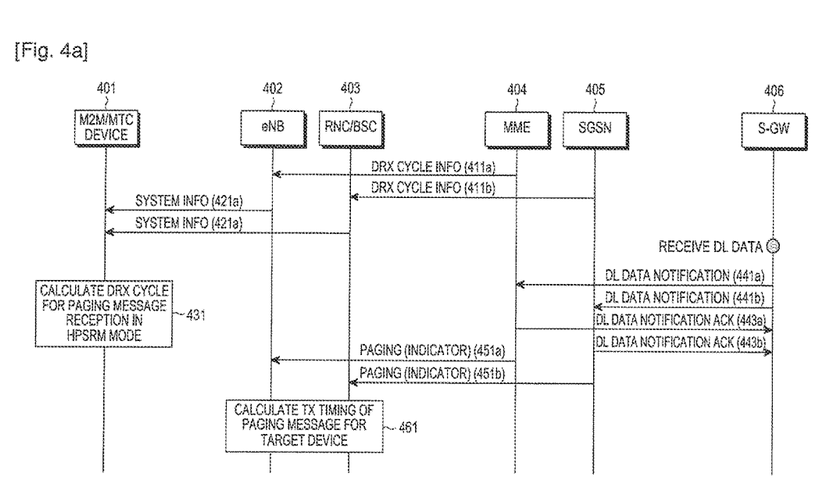
FIGS. 4a and 4b are signal flow diagrams illustrating a paging method for a device operating in an HPSRM mode in a mobile communication system according to an embodiment of the present invention.
Figure 4B:
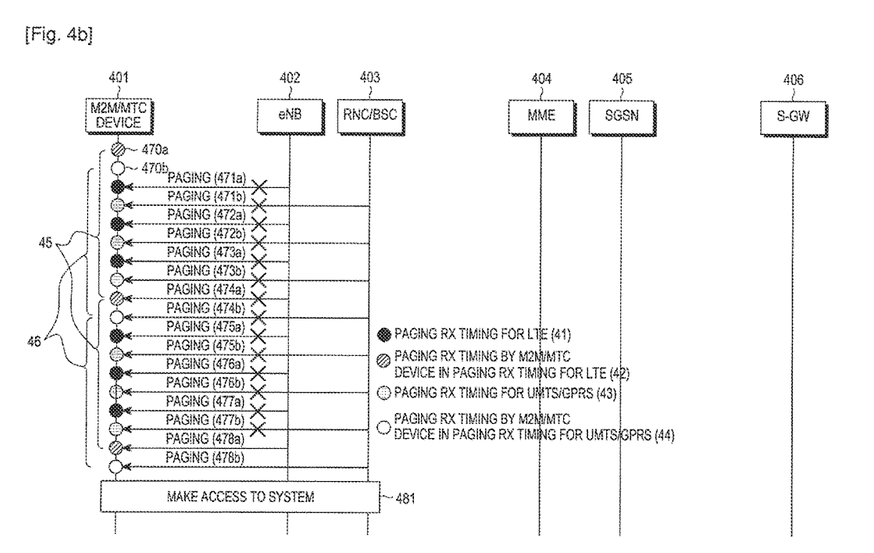

FIGS. 4a and 4b illustrate a paging method for a device operating in an HPSRM mode in a mobile communication system according to an embodiment of the present invention. The procedures of FIGS. 4a and 4b represent an example of a paging method for an M2M/MTC device operating in the HPSRM mode.

In FIGS. 4a and 4b, reference numeral 401 represents an HPSRM M2M/MTC device, reference numerals 402 and 404 represent an eNB and an MME of the LTE system, and reference numerals 403 and 405 represent an RNC/BSC and an SGSN of the UMTS/GPRS system. Reference numeral 406 represents an S-GW applied in common to the LTE system and the UMTS/GPRS system. In the drawing of FIGS. 4a and 4b, both the LTE system and the UMTS/GPRS system are illustrated. If only the LTE system is considered, the system will include the components 401, 402, 404, and 406, and if only the UMTS/GPRS system is considered, the system will include the components 401, 403, 405, and 406.

Referring to FIGS. 4a and 4b, the MME 404 and the SGSN 405 set the above-described separate paging DRX cycle information for reception of a paging message for the M2M/MTC device(s) 401 operating in the HPSRM mode, and transmit the set information to the eNB 402 and the RNC/BSC 403 in steps 411a and 411b. The separate paging DRX cycle information may include, for example, the N2 value. Upon receiving the paging DRX cycle information from the MME 404 and the SGSN 405, the eNB 402 and the RNC/BSC 403 set the paging DRX cycle information as system information, and broadcast the set information to the M2M/MTC device 401 in the cell in steps 421a and 421b. Upon receiving the paging DRX cycle information as system information, the M2M/MTC device 401 operating in the HPSRM mode sets a paging DRX cycle for reception of its paging message in step 431.

In an embodiment of the present invention, the M2M/MTC device 401 may use the following schemes as the schemes of setting a paging DRX cycle by the M2M/MTC device 401.

Scheme 1: N2*'existing paging DRX cycle' (e.g., a paging DRX cycle applied in common to cells and broadcasted as system information, for a UE such as a mobile phone)

Scheme 2: N2*'modification cycle of system information'

Scheme 3: N ms/s or N2*10 ms

The modification cycle of the system information represents a modification cycle of the system information broadcasted by the eNB 402 and the RNC/BSC 403 in the cell, and the system information may not be modified within one system information modification cycle, and may be generated/modified/deleted in a new system information modification cycle. For the modification cycle of the system information, reference can be made to the 3GPP standard TS36.331 for, for example, the LTE system, and to the 3GPP standard TS25.331 for the UMTS/GPRS system.

In steps 470a and 470b, the M2M/MTC device 401 calculates a timing (i.e., a location of a radio frame or a subframe in the radio frame where a paging message is to be received, for example, in the LTE system, and a specific location of a channel in a radio frame where a paging message is to be received, for example, in the UMTS system) for which the M2M/MTC device 401 will receive a paging message, by using the existing paging DRX cycle information for a UE such as a mobile phone and id information of the M2M/MTC device 401 according to the existing 3GPP standards (see the 3GPP UMTS standards TS25.304 and TS25.413, and the 3GPP LTE standards TS36.304 and TS36.413), and checks the reception/non-reception of a paging message for the M2M/MTC device 401 at a first paging message reception timing.

After the first paging message reception timing, the M2M/MTC device 401 periodically checks the reception/non-reception of a paging message at intervals of the paging DRX cycle determined by any one of the Schemes 1, 2 and 3 in steps 474a to 478a and 474b to 478b. That is, after the calculated first paging message reception timing, the M2M/MTC device 401 checks the reception/non-reception of a paging message at intervals of the paging DRX cycle extended by the above scheme (one of Schemes 1 to 3), rather than the existing paging DRX cycle for a UE such as a mobile phone.

Reference numeral 41 represents a paging message reception time applied to a UE such as an existing mobile phone in the LTE system, and reference numeral 42 represents the time the HPSRM M2M/MTC device 401 receives a paging message according to an embodiment of the present invention, in the paging message reception time applied to a UE such as an existing mobile phone in the LTE system.

Reference numeral 43 represents a paging message reception time applied to a UE such as an existing mobile phone in the UMTS/GPRS system, and reference numeral 44 represents the time the HPSRM M2M/MTC device 401 receives a paging message according to an embodiment of the present invention in the UMTS/GPRS system. In addition, each of hatched circles illustrated in steps 474a to 478a and 474b to 478b corresponds to any one of the paging message reception times 41 to 44.

Reference numeral 45 represents a paging DRX cycle for the M2M/MTC device 401 in the LTE system, assuming that the paging DRX cycle is set according to, for example, Scheme 1 and an N2 value is 4. Reference numeral 46 represents a paging DRX cycle for the M2M/MTC device 401 in the UMTS/GPRS system, assuming that the paging DRX cycle is set according to, for example, Scheme 1 and an N2 value is 4.

In steps 441a to 443a and 441b to 443b, upon receiving a notification indicating the reception of DL data from the S-GW 406, the MME 404 and the SGSN 405 transmit a paging message to the eNB 402 and the RNC/BSC 403 existing in the last registered paging area of the target device 401 to which the DL data is to be transmitted. If the target device 401 to receive the paging message is an M2M/MTC device(s) operating in the HPSRM mode, a paging message being delivered to the eNB 402 and the RNC/BSC 403 includes identification information (or indicator) indicating that a target device to receive the paging message is an M2M/MTC device(s) 401 operating in the HPSRM mode, in steps 451a and 451b.

On the other hand, if the target device to receive the paging message is not an M2M/MTC device(s) 401 operating in the HPSRM mode, a paging message delivered to the eNB 402 and the RNC/BSC 403 includes the indicator indicating that the target device to receive the paging message is not an M2M/MTC device(s) 401 operating in the HPSRM mode, in steps 451a and 451b.

Upon receiving the paging message, the eNB 402 and the RNC/BSC 403 calculate a timing for which the paging message is to be transmitted for the target device, as described in FIG. 3. The transmission timing for the paging message can be calculated using the conventional scheme, which may include the 3GPP UMTS standards TS25.304 and TS25.413, and the 3GPP LTE standards TS36.304 and TS36.413, in step 461. Reference numerals 471a, 472a, 473a, 474a, 475a, 476a, 477a, and 478a represent examples of transmitting a paging message for the M2M/MTC device 401 at the calculated transmission timings in the LTE system.

Reference numerals 471b, 472b, 473b, 474b, 475b, 476b, 477b, and 478b represent examples of transmitting a paging message for the M2M/MTC device 401 at the calculated transmission timings in the UMTS/GPRS system. The transmission timings 471a, 472a, 473a, 475a, 476a, and 477a, and 471b, 472b, 473b, 475b, 476b, and 477b for a paging message are the timings at which the M2M/MTC device 401 does not actually check the reception of a paging message, since the M2M/MTC device 401 applies the paging DRX cycle that is extended from the existing paging DRX cycle according to the N2 value which is the paging DRX cycle information the M2M/MTC device 401 received. The M2M/MTC device 401 does not perform operations of receiving the transmitted paging messages at the timings it does not check the reception of a paging message according to the N2 value.

Assume that reference numerals 474a and 474b represent timings at which the M2M/MTC device 401 actually checks the reception of a paging message, but the M2M/MTC device 401 has failed to receive the paging message due to a wireless error. Thereafter, upon receiving the paging message at the timings 478a and 478b, the M2M/MTC device 401 makes access to the system in response to the paging message in step 481. In the above-described embodiment of the present invention, although a paging message is transmitted using the transmission timings in the prior art, the M2M/MTC device 401 checks the reception/non-reception of a paging message with a reception timing longer than the existing transmission timing by using the separate paging DRX cycle information received from the system. Therefore, the M2M/MTC device 401 may maintain the HPSRM mode, avoiding frequently checking the reception/non-reception of a paging message.

In the case where the target device to receive the paging message is an HPSRM M2M/MTC device(s), in the absence of a response message/access for the paging message from the target M2M/MTC device in step 481 as described in the conventional technology of FIG. 3, the eNB 402 and the RNC/BSC 403 may retransmit the paging message N3 times (where N3 represents a predetermined number of retransmissions and is greater than the number N1 of retransmissions) or for a time of a T3 timer (which is greater than the T1 timer) considering the N2 value known as intra-cell system information, instead of retransmitting the paging message N1 times or for a time of the T1 timer.

The reason for increasing the number of retransmissions is that since the paging DRX cycle in which the HPSRM M2M/MTC device(s) checks the reception/non-reception of a paging message is longer by a multiple of N2 than the existing paging DRX cycle for a UE such as a mobile phone, the number N2 of retransmissions or the T1 timer value based on the existing paging DRX cycle may not reliably guarantee the reception of a paging message by the M2M/MTC device(s).

Assuming that the existing paging DRX cycle is 640 ms, the number N1 of retransmissions is 4, and the N2 value according to the present invention is 8, the M2M/MTC device(s) checks the reception/non-reception of a paging message every 5120 ms (640 ms*8) in an embodiment of the present invention, and since the eNB/RNC/BSC transmits a paging message four times or for 2560 ms (640 ms*4), the M2M/MTC device(s) may not receive the paging messages, which are not transmitted for the time of 2560 ms. In another alternative, assuming that the existing paging DRX cycle is 640 ms, the N1 value is 8, and the N2 value is 8, a device(s) such as the existing mobile phone is granted eight opportunities to check the reception/non-reception of a paging message, so the device may receive a paging message reliably despite a wireless error, whereas the M2M/MTC device(s) is granted only one opportunity to check the reception/non-reception of a paging message due to an increase in the paging DRX cycle by the N2 value, so the M2M/MTC device may hardly receive a paging message reliably upon a wireless error.

Therefore, if the target device to receive a paging message is an HPSRM M2M/MTC device(s), the number N1 of retransmissions or the T1 timer value determining the existing number of retransmissions for a paging message should be appropriately re-set as the number N3 of retransmissions or a T3 timer value, which is greater than the number N1 of retransmissions or the T1 timer value, considering the N2 value which is paging DRX cycle information proposed by the present invention.

The embodiment of FIGS. 4a and 4b provides a method for setting an N2 value representing a paging DRX cycle based on any one of Schemes 1 to 3, and allowing an MME 404 and the SGSN 405 to transmit the paging DRX cycle information to the eNB 402 and the RNC/BSC 403, and the eNB 402 and the RNC/BSC 403 to broadcast the paging DRX cycle information as system information in the cell. In the alternative, an operating method of determining the N2 value as a specific prefixed value by the 3GPP standard, and an operating method of notifying an upper layer of, as the N2 value, a value determined in the upper layer of each of the M2M/MTC devices may also be available. If the latter method is used, broadcasting the N2 value in the cell is optional.

Figure 5A:
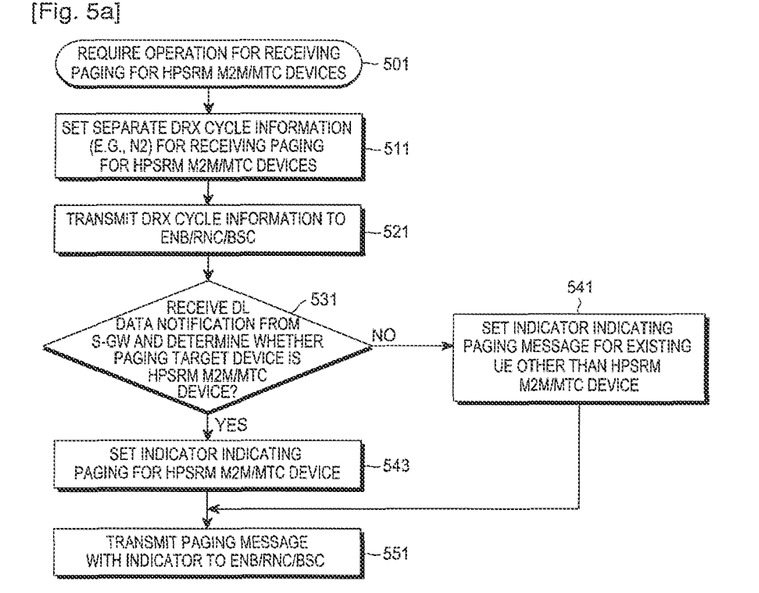
FIGS. 5a to 5c are flowcharts illustrating operations of an MME/SGSN and an eNB/RNC/BSC in a mobile communication system with the paging method of FIGS. 4a and 4b.
Figure 5B:
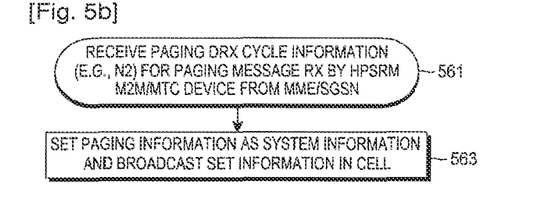
Figure 5C:
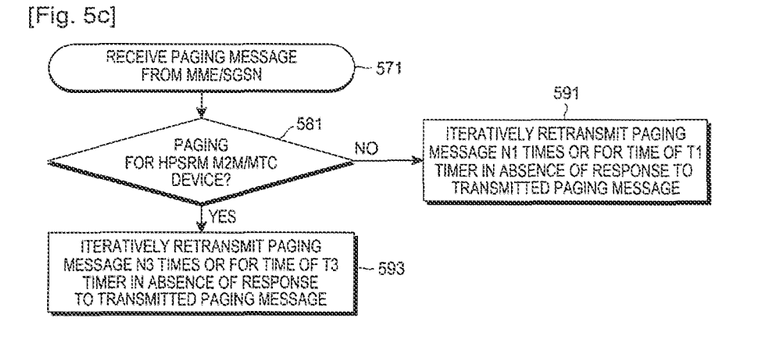

FIGS. 5a to 5c illustrate operations of an MME/SGSN and an eNB/RNC/BSC in a mobile communication system with the paging method of FIGS. 4a and 4b according to an embodiment of the present invention.

Specifically, FIG. 5a illustrates an operation of the MME/SGSN performing the paging method according to an embodiment of the present invention, and FIGS. 5b and 5c illustrate operations of the eNB/RNC/BSC.

Referring to FIG. 5a, if there is a need for a separate operation of receiving a paging message for HPSRM M2M/MTC devices in step 501, the MME/SGSN sets separate paging DRX cycle information (e.g., N2 in FIGS. 4a and 4b) for receiving a paging message for the M2M/MTC devices in step 511. In step 521, the MME/SGSN transmits the set paging DRX cycle information to associated eNB/RNC/BSC in step 521. In step 531, upon receiving a notification indicating reception of DL data from an S-GW, the MME/SGSN checks whether a target device to which the DL data is to be transmitted, or a target device to receive a paging message caused by the DL data is an HPSRM M2M/MTC device(s), based on subscriber information.

If the target device is an HPSRM M2M/MTC device, the MME/SGSN sets an indicator (or identification information) indicating a paging message for an HPSRM M2M/MTC device(s) in the paging message in step 543, and transmits the paging message to the eNB/RNC/BSC in step 551. On the other hand, if the target device is not an HPSRM M2M/MTC device(s) in step 531, the MME/SGSN sets an indicator indicating a paging message for a device other than an HPSRM M2M/MTC device(s) in the paging message in step 541, and transmits the paging message with the indicator to the eNB/RNC/BSC in step 551.

An operation of the eNB/RNC/BSC performing the paging method by the present invention will now be described with reference to FIG. 5b. Upon receiving separate paging DRX cycle information (e.g., N2 in FIGS. 4a and 4b) for receiving a paging message for an HPSRM M2M/MTC device(s) from the eNB/RNC/BSC in step 561, the eNB/RNC/BSC sets the received paging DRX cycle information as system information and broadcasts the set information to the HPSRM M2M/MTC device(s) in the cell in step 563.

An operation of the eNB/RNC/BSC after broadcasting the system information will be described with reference to FIG. 5c. Upon receiving the paging message with the indicator set therein from the MME/SGSN in step 571, the eNB/RNC/BSC checks the indicator in the paging message in step 581. If the paging message is a paging message for an HPSRM M2M/MTC device as a result of the check, the eNB/RNC/BSC calculates a timing for which a paging message is to be transmitted for a target device in a conventional manner, and transmits the paging message in the calculated transmission timing. Thereafter, in step 593, in the absence of a response (response message or response access) to the paging message from the target M2M/MTC device, the eNB/RNC/BSC may iteratively retransmit the paging message N3 times (where N3 represents the number of retransmissions) or for a time of a T3 timer as described in FIGS. 4a and 4b.

If the paging message is not a paging message for an HPSRM M2M/MTC device in step 581 as a result of checking the indicator, the eNB/RNC/BSC calculates a timing for which a paging message is to be transmitted for the target device in a conventional manner, and transmits the paging message in the calculated transmission timing in step 581. Thereafter, in step 591, in the absence of a response (response message or response access) to the paging message, the eNB/RNC/BSC may repeatedly retransmit the paging message N1 times or for a time of a T1 timer as described in FIG. 3.

Figure 6:
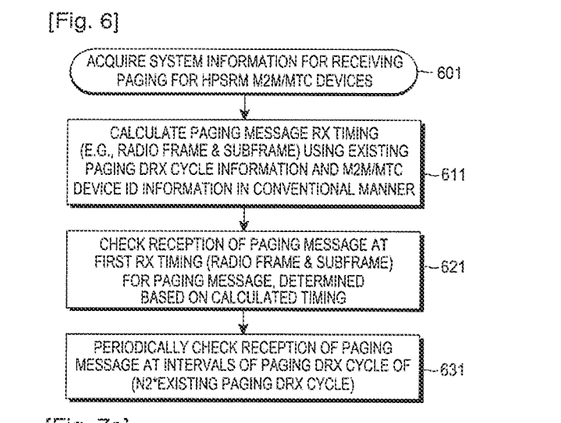
FIG. 6 is a flowchart illustrating an operation of an HPSRM M2M/MTC device in a mobile communication system with a paging method according to an embodiment of the present invention.

FIG. 6 illustrates an operation of an HPSRM M2M/MTC device in a mobile communication system with a paging method according to an embodiment of the present invention.

Referring to FIG. 6, an HPSRM M2M/MTC device acquires system information (e.g., N2 in FIG. 4) for receiving a paging message for M2M/MTC devices, broadcasted by the eNB/RNC/BSC, in step 601. In step 611, the HPSRM M2M/MTC device calculates a reception timing (i.e., a location of a radio frame or a subframe in the radio frame where a paging message is to be received, for example, in the LTE system, and a specific location of a channel in a radio frame where a paging message is to be received, for example, in the UMTS system) for which the M2M/MTC device will receive a paging message, by using the existing paging DRX cycle information for a UE such as a mobile phone and id information of the M2M/MTC device according to the existing 3GPP standards (see the 3GPP UMTS standards TS25.304 and TS25.413, and the 3GPP LTE standards TS36.304 and TS36.413).

In step 621, the M2M/MTC device checks the reception/non-reception of a paging message for the M2M/MTC device at a first paging message reception timing. In step 631, after the first paging message reception timing, the M2M/MTC device periodically checks the reception/non-reception of a paging message at intervals of a paging DRX cycle calculated by any one of above-described Schemes 1 to 3, e.g., a paging DRX cycle of (i) N2 *'existing paging DRX cycle for a UE such as a mobile phone', (ii) N2*'system information modification cycle', or (iii) N2 ms/s or N2*10 ms. In other words, after the calculated first paging message reception timing, the M2M/MTC device checks the reception/non-reception of a paging message at intervals of the paging DRX cycle extended by the above scheme (one of Schemes 1 to 3), rather than the existing paging DRX cycle for a UE such as a mobile phone.

Structures of network entities (or nodes) performing the paging method of the present invention will be described below.

Figure 7A:
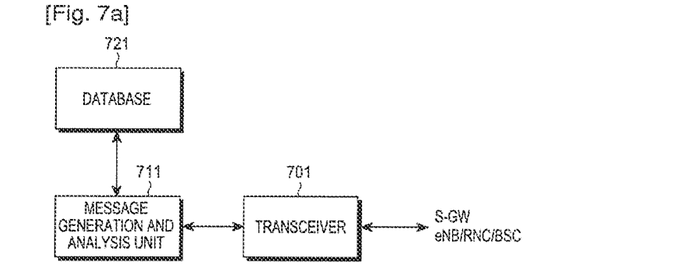
FIG. 7a is a block diagram illustrating a structure of an MME/SGSN according to an embodiment of the present invention.

FIG. 7a illustrates a structure of an MME/SGSN according to an embodiment of the present invention.

Referring to FIG. 7a, the MME/SGSN includes a transceiver 701, a message generation and analysis unit 711, and a database 721. The message generation and analysis unit 711 sets paging DRX cycle information (e.g., N2 in FIGS. 4a and 4b) for an M2M/MTC device, and transmits the set information to its associated eNB/RNC/BSC through the transceiver 701. The message generation and analysis unit 711 receives a Downlink Data Notification message indicating reception of DL data from an S-GW through the transceiver 701, and analyzes information included in the received notification message.

The information contained in the notification message may include information on a port number through which a device id or DL data has arrived. The MME/SGSN may detect device/UE or user information from the database 721 based on the above information. The MME/SGSN determines whether a target device to which a paging message caused by reception of the DL data is to be transmitted, is an M2M/MTC device, using the database 721 in which the analyzed information and the device/UE or user information are stored. The MME/SGSN generates a paging message including an indicator indicating whether the target device is an M2M/MTC device, and transmits the generated paging message to the eNB/RNC/BSC via the transceiver 701.

Figure 7B:
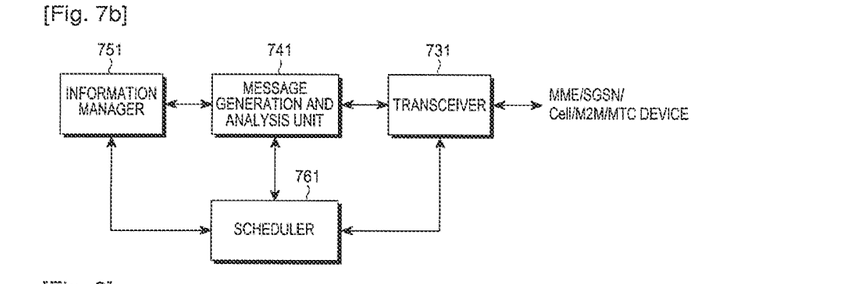
FIG. 7b is a block diagram illustrating a structure of an eNB/RNC/BSC according to an embodiment of the present invention.

FIG. 7b illustrates a structure of an eNB/RNC/BSC according to an embodiment of the present invention.

Referring to FIG. 7b, the eNB/RNC/BSC includes a transceiver 731, a message generation and analysis unit 741, an information manager 751, and a scheduler 761.

The message generation and analysis unit 741 receives paging DRX cycle information for M2M/MTC devices and a paging message with the indicator set therein from an MME/SGSN through the transceiver 731, analyzes the paging DRX cycle information, stores the analyzed information in the information manager 751, generates paging DRX cycle information (e.g., N2 in FIGS. 4a and 4b) for M2M/MTC devices as system information, and broadcasts the generated information in the cell through the transceiver 731. Upon receiving a paging message for an M2M/MTC device(s) from the MME/SGSN, the message generation and analysis unit 741 calculates candidate timings at which the M2M/MTC device(s) will receive a paging message, using the scheduler 761, and transmits the paging message through the transceiver 731 at the calculated candidate timings.

The term 'candidate timing' refers to a timing applied for retransmission of a paging message. In the absence of a response message/response access from M2M/MTC device(s) in reply to the transmitted paging message for the M2M/MTC device(s), the message generation and analysis unit 741 may retransmit the paging message at the calculated candidate timings N3 times (where N3 represents the number of retransmissions) or for a time of a T3 timer, which are scheduled by the scheduler 761.

Figure 8:
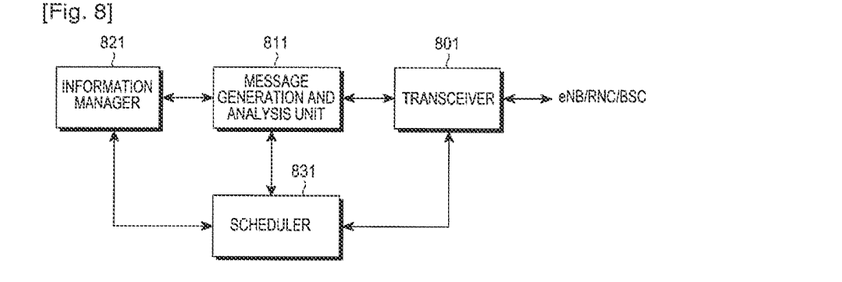
FIG. 8 is a block diagram illustrating a structure of an HPSRM M2M/MTC device according to an embodiment of the present invention.

FIG. 8 illustrates a structure of an HPSRM M2M/MTC device according to an embodiment of the present invention.

Referring to FIG. 8, the HPSRM M2M/MTC device includes a transceiver 801, a message generation and analysis unit 811, an information manager 821, and a scheduler 831.

It is assumed that the HPSRM M2M/MTC device operates in an idle mode, and receives a paging message in an HPSRM mode according to the paging reception timing of the present invention.

Upon acquiring paging DRX cycle information for an M2M/MTC device(s), which is broadcasted in the cell, from an eNB/RNC/BSC through the transceiver 801, the message generation and analysis unit 811 analyzes the paging DRX cycle information, and stores the acquired information in the information manager 821 depending on the analysis. The information manager 821 stores the existing paging DRX cycle information, the M2M/MTC device id information, and the acquired separate paging DRX cycle information for M2M/MTC device(s), all of which are associated with reception of a paging message. The scheduler 831 determines a first timing for reception of a paging message and a paging DRX cycle to be applied for succeeding paging reception, using the existing paging DRX cycle information for a UE such as an existing mobile phone, the M2M/MTC device id information, and the acquired separate paging DRX cycle information for an M2M/MTC device(s), and the message generation and analysis unit 811 checks the reception/non-reception of a paging message at the determined timing by means of the transceiver 801. Upon receiving a paging message, the message generation and analysis unit 811 generates an uplink message, and makes access to the system through the transceiver 801.

The above-described embodiment of the present invention is subject to various modifications.

For example, although it has been assumed in the above embodiment that the M2M/MTC device is an idle mode UE that receives a paging message according to a paging DRX cycle, the same may be applied to a W-CDMA-based connected mode UE that operates at intervals of a DRX cycle determined by, for example, network scheduling. In this case, if the connected mode UE performs an HPSRM operation of an M2M/MTC device, a wake-up cycle of the UE may be set longer than that of an ordinary UE non-supporting the HPSRM mode by applying the above-described embodiment.

The HPSRM operation of an M2M/MTC device may be performed in a device-specific method that performs the HPSRM mode according to the type of the device, or a service/data flow-specific method that performs the HPSRM mode according to the type of the service/data.

In the above-described embodiment, in order for the network to determine whether a specific UE is a UE operating in the HPSRM mode, the network may register information on UEs operating in the HPSRM mode in the means for storing subscriber information, such as, for example, a Home Location Register (HLR), or the UE may directly transmit to the network a registration message indicating that the UE itself is an M2M/MTC device.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for transmitting a paging message by a base station in a wireless communication system, the method comprising:
   configuring a first discontinuous reception (DRX) cycle, a second DRX cycle, and a time duration to transmit the paging message to a terminal;
   determining, based on the first DRX cycle, a starting position of the time duration; and
   transmitting, to the terminal, the paging message, based on the second DRX cycle, during the configured time duration that begins at the determined starting position,
   wherein a length of the first DRX cycle is a multiple of a length of the second DRX cycle.

2. The method of claim 1, further comprising:
   determining at least one timing in the time duration to transmit the paging message based on the second DRX cycle; and
   transmitting the paging message in the determined at least one timing.

3. The method of claim 1, further comprising determining a first timing to receive the paging message based on the time duration.

4. The method of claim 1, wherein at least one of the first DRX cycle, the second DRX cycle, or the time duration is configured by an upper layer signaling.

5. The method of claim 1, wherein the first DRX cycle is used for transmitting to a first type of terminal and the second DRX cycle is used for transmitting to a second type of terminal.

6. A method for receiving a paging message by a terminal in a wireless communication system, the method comprising:
   configuring a first discontinuous reception (DRX) cycle, a second DRX cycle, and a time duration to receive the paging message from a base station;
   determining, based on the first DRX cycle, a starting position of the time duration; and
   receiving the paging message, based on the second DRX cycle, during the configured time duration that begins at the determined starting position,
   wherein a length of the first DRX cycle is a multiple of a length of the second DRX cycle.

7. The method of claim 6, wherein receiving the paging message comprises:
   determining at least one timing in the time duration to receive the paging message based on the second DRX cycle; and
   receiving the paging message in the determined at least one timing.

8. The method of claim 6, further comprising determining a first timing to receive the paging message based on the time duration.

9. The method of claim 6, wherein at least one of the first DRX cycle, the second DRX cycle, or the time duration is configured by an upper layer signaling.

10. The method of claim 6, wherein the first DRX cycle is used for transmitting to a first type of terminal and the second DRX cycle is used for transmitting to a second type of terminal.

11. A base station for transmitting a paging message in a wireless communication system, the base station comprising:
    a transceiver configured to transmit and receive signals; and
    a controller configured to:
      determine a first discontinuous reception (DRX) cycle, a second DRX cycle, and a time duration to transmit the paging message to a terminal, wherein a length of the first DRX cycle is a multiple of a length of the second DRX cycle;
      determine, based on the first DRX cycle, a starting position of the time duration; and
      transmit, via the transceiver, the paging message, based on the second DRX cycle, to the terminal during the configured time duration that begins at the determined starting position.

12. The base station of claim 11, wherein the transceiver is further configured to:
    determine at least one timing in the time duration to transmit the paging message based on the second DRX cycle; and
    transmit the paging message in the determined at least one timing.

13. The base station of claim 11, wherein the controller is further configured to determine a first timing to receive the paging message based on the time duration.

14. The base station of claim 11, wherein at least one of the first DRX cycle, the second DRX cycle, or the time duration is configured by an upper layer signaling.

15. The base station of claim 11, wherein the first DRX cycle is used for transmitting to a first type of terminal and the second DRX cycle is used for transmitting to a second type of terminal.

16. A terminal for receiving a paging message in a wireless communication system, the terminal comprising:
    a transceiver configured to transmit and receive signals; and
    a controller configured to:
      determine a first discontinuous reception (DRX) cycle, a second DRX cycle, and a time duration to receive the paging message from a base station, wherein a length of the first DRX cycle is a multiple of a length of the second DRX cycle;
      determine, based on the first DRX cycle, a starting position of the time duration; and
      receive, via the transceiver, the paging message, based on the second DRX cycle, during the configured time duration that begins at the determined starting position.

17. The terminal of claim 16, wherein the transceiver further configured to:
    determine at least one timing in the time duration to receive the paging message based on the second DRX cycle; and receive the paging message in the determined at least one timing.

18. The terminal of claim 16, wherein the controller is further configured to determine a first timing to receive the paging message based on the time duration.

19. The terminal of claim 16, wherein at least one of the first DRX cycle, the second DRX cycle, or the time duration is configured by an upper layer signaling.

20. The terminal of claim 16, wherein the first DRX cycle is used for transmitting to a first type of terminal and the second DRX cycle is used for transmitting to a second type of terminal.

\* \* \* \* \*